(12) United States Patent
Febrer et al.

(10) Patent No.: US 9,120,477 B2
(45) Date of Patent: Sep. 1, 2015

(54) AUTOMOTIVE VEHICLE BRAKING MANAGEMENT SYSTEM AND METHOD

(75) Inventors: Pascal Febrer, Paris (FR); Arnaud Losq, Montigny le Bretonneux (FR); Alessandro Monti, La Garenne Colombes (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 1071 days.

(21) Appl. No.: 13/061,958

(22) PCT Filed: Aug. 14, 2009

(86) PCT No.: PCT/FR2009/051590
§ 371 (c)(1),
(2), (4) Date: Jul. 26, 2011

(87) PCT Pub. No.: WO2010/026330
PCT Pub. Date: Mar. 11, 2010

(65) Prior Publication Data
US 2011/0272225 A1    Nov. 10, 2011

(30) Foreign Application Priority Data
Sep. 5, 2008  (FR) .................... 08 55990

(51) Int. Cl.
*B60T 7/12* (2006.01)
*B60T 13/74* (2006.01)
*B60T 17/22* (2006.01)

(52) U.S. Cl.
CPC ............ *B60T 13/746* (2013.01); *B60T 7/12* (2013.01); *B60T 17/221* (2013.01)

(58) Field of Classification Search
USPC ........... 303/191, 154; 188/158; 477/194, 195, 477/198; 701/36, 45, 48, 65, 70, 78, 116
See application file for complete search history.

(56) References Cited

U.S. PATENT DOCUMENTS

| 8,220,877 B2 * | 7/2012 | Makishima et al. ............ 303/16 |
| 2002/0108816 A1 | 8/2002 | Taniguchi |
| 2004/0026988 A1 | 2/2004 | Ewinger et al. |
| 2004/0113486 A1 | 6/2004 | Koga et al. |

FOREIGN PATENT DOCUMENTS

| DE | 100 23 063 | 12/2001 |
| DE | 100 61 064 | 6/2002 |
| DE | 103 57 121 | 7/2005 |

OTHER PUBLICATIONS

International Search Report Issued Dec. 21, 2009 in PCT/FR09/051590 filed Aug. 14, 2009.

* cited by examiner

*Primary Examiner* — Adam Tissot
(74) *Attorney, Agent, or Firm* — Oblon, McClelland, Maier & Neustadt, L.L.P.

(57) ABSTRACT

A system for managing braking of an automotive vehicle including an assisted parking brake with at least one brake actuator capable of acting on at least one wheel of the vehicle and a mechanism applying the parking brake. The system includes a mechanism automatically increasing firmness with which the parking brake is applied after the vehicle engine stops, which includes a module that detects stopping of the engine and a module that commands an increase in the firmness of application. The module is configured to emit a signal characteristic of the stopping of the engine as a function of a status of the engine and of a status of an electrical supply. The module is configured to emit a signal demanding an increase in the firmness of application as a function of a status of the brake actuators and of signal characteristic of the stopping of the engine that comes from the module.

7 Claims, 3 Drawing Sheets

AUTOMOTIVE VEHICLE BRAKING MANAGEMENT SYSTEM AND METHOD

BACKGROUND

The present invention relates to the management of the braking of a motor vehicle fitted with a power-assisted parking brake (usually known under the abbreviation FPA).

This type of automatically power-assisted parking brake constitutes a significant advance over the conventional handbrakes of motor vehicles. Specifically, it becomes possible to apply the rear brakes when the vehicle stops in optimal conditions without the application being too great or too little. It becomes possible to automatically release the application of the parking brake when the driver wants to drive the vehicle forward, for example when the driver engages a gear ratio and accelerates sufficiently to set the vehicle in motion. The application of the parking brake can also be carried out manually via a control, that can be actuated by the driver, on the dashboard of the vehicle. In any case, the automatic release of the parking brake constitutes a hill start assistance. The braking management system can actually, in this case, release the application when the engine provides enough torque to move the vehicle forward depending on the slope determined by a sensor and taken into account by the vehicle's onboard computer.

Such power-assisted parking brake systems comprise many safety functions. It will be possible to refer in particular to French patent application 2 906 515 belonging to the applicant in which automatic application of the parking brake is provided in the event of a malfunction of alarm means signaling an absence of application.

In general, the parking brake is applied with a determined force of application which corresponds to the maximum possible application, which has the drawback of not taking account of the conditions of use of the vehicle and may cause, in the long term, excessive wear reducing the service life of the system.

It can be envisaged not to proceed initially with a maximum application, being content with a provisional application depending on the conditions of use of the vehicle. The force of application can then, in particular, take account of the slope on which the vehicle stands. It is also possible to carry out an application that is less than the maximum application when the engine continues to run although the vehicle is stationary, which means that the driver envisages a temporary standstill. In these various situations, however, it is necessary to carry out a reapplication of the parking brake if a loss of application force is noticed over time, or if the conditions of use of the vehicle change. This however requires the use of additional sensors such as application-force sensors, and leads to a monitoring requirement over time which can be a disadvantage particularly in terms of power consumption.

BRIEF SUMMARY

The object of the present invention is to solve these problems and to propose a system and a method for managing the braking of a motor vehicle fitted with a power-assisted parking brake which allows an initial application taking account of the conditions of use of the vehicle and which allows an automatic reapplication by simple means that require no sensor or additional member likely to increase power consumption.

A further object of the invention is to improve the safety of the power-assisted parking brake fitted to a motor vehicle.

In one embodiment, a system for managing the braking of a motor vehicle fitted with a power-assisted parking brake with at least one brake actuator capable of acting on at least one wheel of the vehicle comprises means for applying the parking brake and means for automatically increasing the application of the parking brake after the vehicle engine has been stopped. Thus, the parking brake is automatically reapplied without it being necessary to measure a possible loss in application force over time. It becomes possible to apply, during the first application, an application force that is less than the maximum application and is suitable for the conditions of use, such as the sloping of the roadway or situations in which the vehicle engine is running. The endurance of the parking brake and it longevity are thereby increased.

In a preferred embodiment, the means for automatically increasing the application comprise a module for detecting whether the engine has been stopped and a module for controlling the increase in application.

The module for detecting whether the engine has been stopped advantageously comprises means for transmitting a signal characteristic of the engine having been stopped as a function of the state of the engine and of the state of the engine power supply.

The state of the engine, that is to say whether the engine is running or has been stopped, can be detected by information originating from the control of fuel injection into the engine, information that is available, notably on the control local network (usually called CAN) that connects together the various members of the engine and an electric power supply module with an electronic control unit or a vehicle's onboard computer.

The module for controlling the increase in application preferably comprises means for transmitting a signal requesting an increase in application as a function of the state of the brake actuators and of the signal characteristic of the engine being stopped.

It is therefore possible in particular to not proceed with an increase in application if the single brake actuator or all the brake actuators are defective or if the driver of the vehicle does not wish to apply the parking brake, in which case all the actuators are in the released state.

According to another aspect, the proposal is for a method for managing the braking of a motor vehicle fitted with a power-assisted parking brake with at least one brake actuator capable of acting on at least one wheel of the vehicle, wherein the application and the release of the parking brake is automatically commanded or commanded on request by the vehicle driver, and wherein an increase in the application of the parking brake is automatically commanded after the vehicle engine has been stopped.

The engine having been stopped is detected preferably by taking account of the state of the engine and of the state of the engine power supply.

Accordingly, it is possible to make use of information originating either from a local control network (CAN network) or from a direct wire connection in order to ascertain the state of the engine and the state of the engine power supply.

Then a signal requesting an increase in application is transmitted as a function of the state of the brake actuators and of a signal characteristic of the engine being stopped.

Preferably, before a signal requesting an increase in application is transmitted, it is determined whether each actuator is already applied or being applied and the state of operation of each actuator is determined.

As a variant, it is also possible to detect an insufficient application, that is to say below a threshold, and then carry out an increase in application.

The system and the method mentioned above apply in the case of parking brakes that have only one brake actuator and in the case of parking brakes comprising several actuators and in particular one actuator on each brake-application caliper.

BRIEF DESCRIPTION OF THE DRAWINGS

Other features and advantages of the invention will appear on reading the detailed description of one embodiment of the invention given as a nonlimiting example and made with reference to the appended drawings in which.

DETAILED DESCRIPTION

Figure 1:
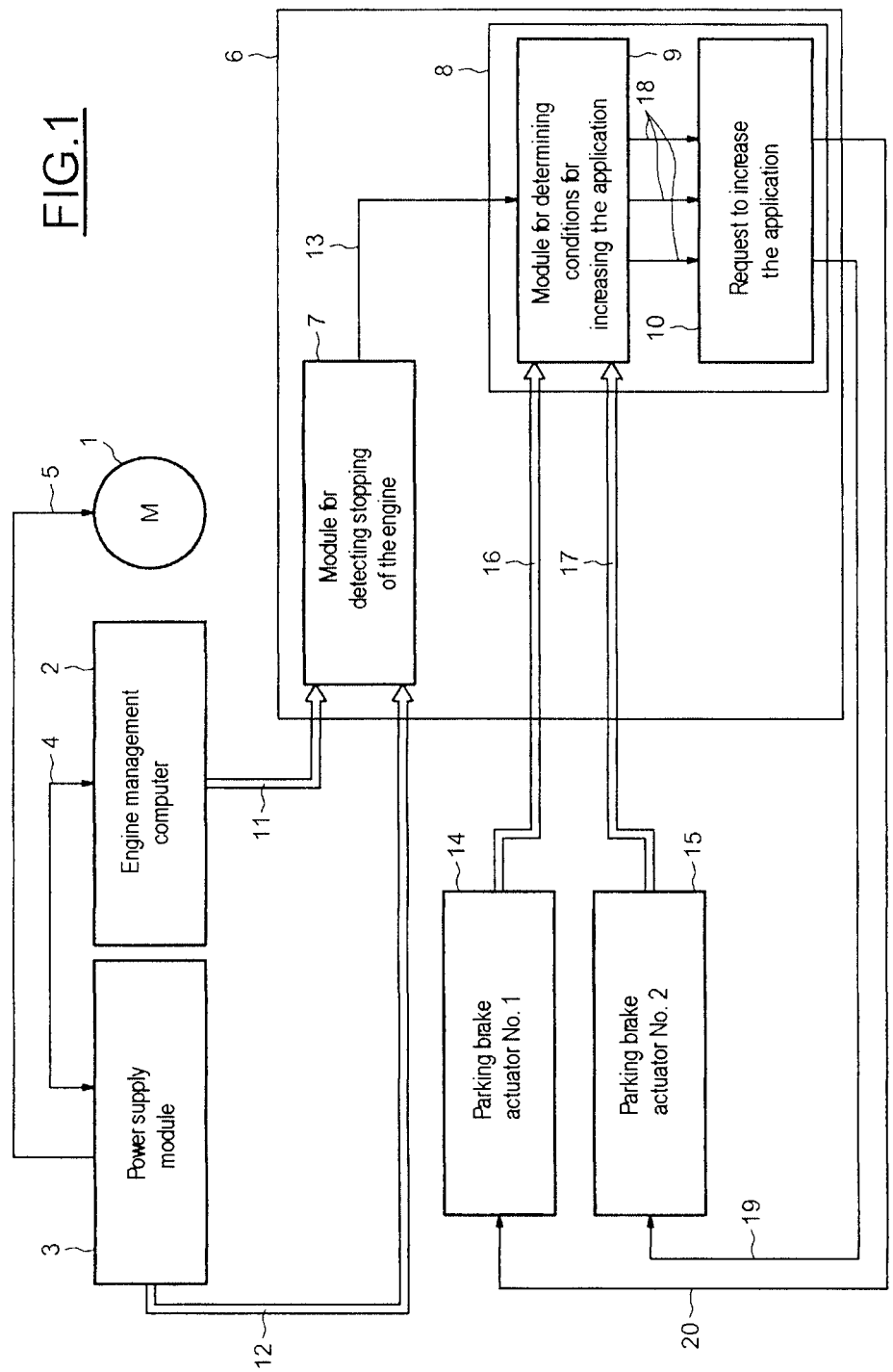
FIG. 1 represents schematically the main elements of a system for managing the braking of a motor vehicle according to the invention.

As illustrated in FIG. 1, a braking management system is adapted to a motor vehicle not shown in the figure, comprising a power-assisted parking brake (FPA). The vehicle comprises a drive train schematized in the form of an engine 1 that may comprise a heat engine and one or more electric machines, and of which the operation is controlled by an electronic control unit represented in the form of an engine management computer, referenced 2 in the figure. A power supply module 3 connected to the computer 2 via a connection 4 is connected to the engine 1 via a connection 5 so as to provide the electric power supply necessary for the engine to operate.

The main members of the braking management system are combined in an assembly 6 which comprises a module for detecting whether the engine has been stopped, referenced 7, and a module for commanding the increase in application, referenced 8. The module 8 for its part comprises a module for determining the conditions for increasing the application of the parking brake, referenced 9, and a module 10 for requesting an increase in application.

The module 7 for detecting whether the engine has been stopped receives via a connection 11 information on the state of the engine, that is to say in particular if the engine has been stopped or if the engine is running. An item of information on the electric power supply of the engine is also supplied to the detection module 7 via a connection 12 originating from the power supply module 3, that is to say whether or not the electric ignition is switched on.

The module 7 for detecting whether the engine has been stopped transmits signals that correspond to the engine being stopped, these signals being transmitted via the connection 13 to the module 9 for determining the conditions for increasing the application. The module 9 also receives information on the state of the parking brake actuators. In the example illustrated, the braking system comprises two parking brake actuators, No. 1 and No. 2, referenced respectively 14 and 15. The state of these two actuators 14 and 15 is transmitted via the respective connections 16 and 17 to the module 9. The module 9 is connected via connections 18 to the module 10 for requesting an increase in application, which is capable of transmitting increased application of instructions that are transmitted via the connections 19 and 20 to the parking brake actuators 14 and 15.

The system thus described operates in the following manner: the module 7 for detecting whether the engine has been stopped is capable, depending on the state of the engine, which comes to it via the connection 11, and on the state of the engine power supply which comes to it via the connection 12, of transmitting reliably over the output connection 13, a signal corresponding to the engine actually being stopped.

The module 9 for determining the conditions for increasing the application takes account for its part of the state of the brake actuators 14 and 15 which is transmitted to it via the respective connections 16 and 17. If the two actuators are working and are also applied, which corresponds to a first application made at an earlier time, the module 9 is capable of transmitting a signal over the output connections 18 when it has also received a signal corresponding to the engine being stopped, a signal that is transmitted to it via the connection 13 from the module 7 for detecting whether the engine has been stopped. The module 10 generates the control signals that act via the connections 19 and 20 on the two actuators 14 and 15 so as to cause the increase in application.

Figure 2:
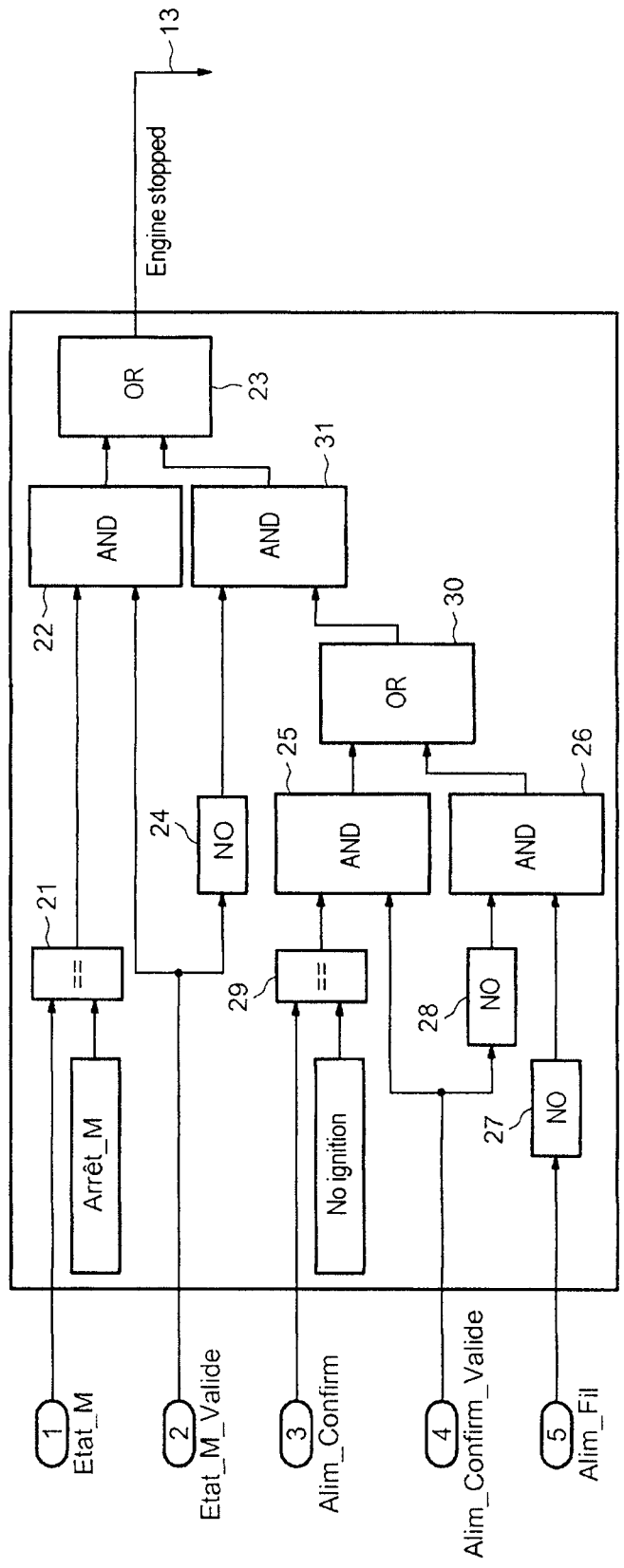
FIG. 2 illustrates schematically the structure of a module for detecting whether the engine has been stopped.

FIG. 2 illustrates a possible embodiment of the module for detecting whether the engine has been stopped, referenced 7 in FIG. 1. The module illustrated in FIG. 2 transmits an engine stopped signal after a series of logic tests corresponding to certain conditions that relate to the input parameters that are, in the example illustrated, five in number, namely:

Etat_M which corresponds to the state of the engine supplied by the computer 2 illustrated in FIG. 1;

Etat_M_Valide which is a parameter reflecting the fact that the engine state signal is enabled, that is to say effectively corresponds to the state of the engine in the absence of any malfunction, for example of the computer 2;

Alim_Confirm is a parameter representing the confirmation of the state of the electric power supply of the engine appearing on the local control network (CAN network);

Alim_Confirm_Valide is a parameter that reflects the enabled character of the previous parameter, that is to say the absence of any malfunction in the CAN network;

Alim_Fil is a parameter that corresponds to the electric power supply of the engine that results this time from an item of information originating from a direct wire connection and not from the CAN control network. This parameter is capable of supplying an item of information on the electric power supply even if the CAN network malfunctions.

The first logic tests that are run relate to the state of the engine. Accordingly, first of all a check is made in the equals unit 21 whether the parameter Etat_M is equal to the reference value Arrêt_M. If this is the case, a logic signal is transmitted to one of the inputs of a logic unit AND 22. In parallel, the validity of the parameter relating to the state of the engine is verified. Accordingly, the parameter Etat_M_Valide is conveyed to the second input of the logic unit 22. If these two inputs actually correspond to a state in which the engine has been stopped, this state being valid, a logic signal appears at the output of the unit AND 22 and is conveyed to one of the inputs of the output unit OR 23.

A certain number of logic tests are also run on the electric power supply of the engine. First of all, the parameter Alim_Confirm is compared, in the equals unit 29, with the reference value no ignition. If the engine power supply is indeed switched off, a logic signal appears at the output of the equals unit 29 and is conveyed to one of the inputs of a logic unit AND 25. In parallel, a check is made on whether the information concerning the electric power supply of the engine is indeed valid, that is to say that there is no malfunction on the CAN network. Accordingly, the parameter Alim_Confirm_Valide is conveyed to the second input of the logic unit AND 25. If the power supply is indeed switched off and this information is valid, a signal appears at the output of the logic unit AND 25 and is conveyed to one of the inputs of a logic unit OR 30.

Account is also taken of the case in which a malfunction appears on the CAN network. In this case, a unit NO 28 to which the parameter Alim_Confirm_Valide is conveyed transmits at its output a logic signal to one of the inputs of a unit AND 26. The second input of this unit AND 26 receives a logic signal originating from a unit NO 27 which receives on its input the parameter Alim_Fil. If the power supply is switched off and this information cannot come from the CAN network because of a malfunction but comes from the wire connection of the vehicle, a logic signal therefore appears at the output of the unit AND 26, this signal being conveyed to the second input of the unit OR 30 which also receives the output from the logic unit AND 25.

In these conditions, whether the absence of power supply is transmitted normally via the CAN network, or, in the event of a failure of the latter, via the wire network, a logic signal appears at one of the inputs of the logic unit OR 30 which transmits on its output a signal that is conveyed to the second input of the logic unit AND 31. The latter moreover receives on its first input a logic signal transmitted via a unit NO 24, which receives on its input the parameter Etat_M_Valide. It is in this way that a logic signal appears at the output of the unit AND 31, when an absence of electric power supply has been confirmed as indicated above, or the signal corresponding to the state of the engine is not valid. A logic signal at the output of the unit AND 31 is conveyed to the second input of the unit OR 23.

The engine being stopped is therefore detected according to the following conditions:
Etat_M (an item of information supplied by the CAN network and corresponding for example to the injection of fuel into the engine) switches from "engine running" to "engine stopped"
OR
the item of information Etat_M is not valid
AND the information on the electric power supply of the engine (the information appearing on the CAN network and originating from the power supply module 3 of FIG. 1) is switched off
OR
the item of information Etat_M and the item of information Alim_Confirm are not valid on the CAN network
AND the wire information on the power supply is switched off.

In this manner, the increase in application of the brake actuators is systematically requested when it is effectively ascertained that the engine has been stopped. If the information on the state of the engine is not available on the CAN network, the information relating to the electric power supply is used. If the items of information on the state of the engine and on the electric power supply are not available on the CAN network, the information originating from the wire connections is used directly. However, only one valid item of information is used by virtue of the existence of the unit OR 23 in order to limit false detections of the engine being stopped.

Figure 3:
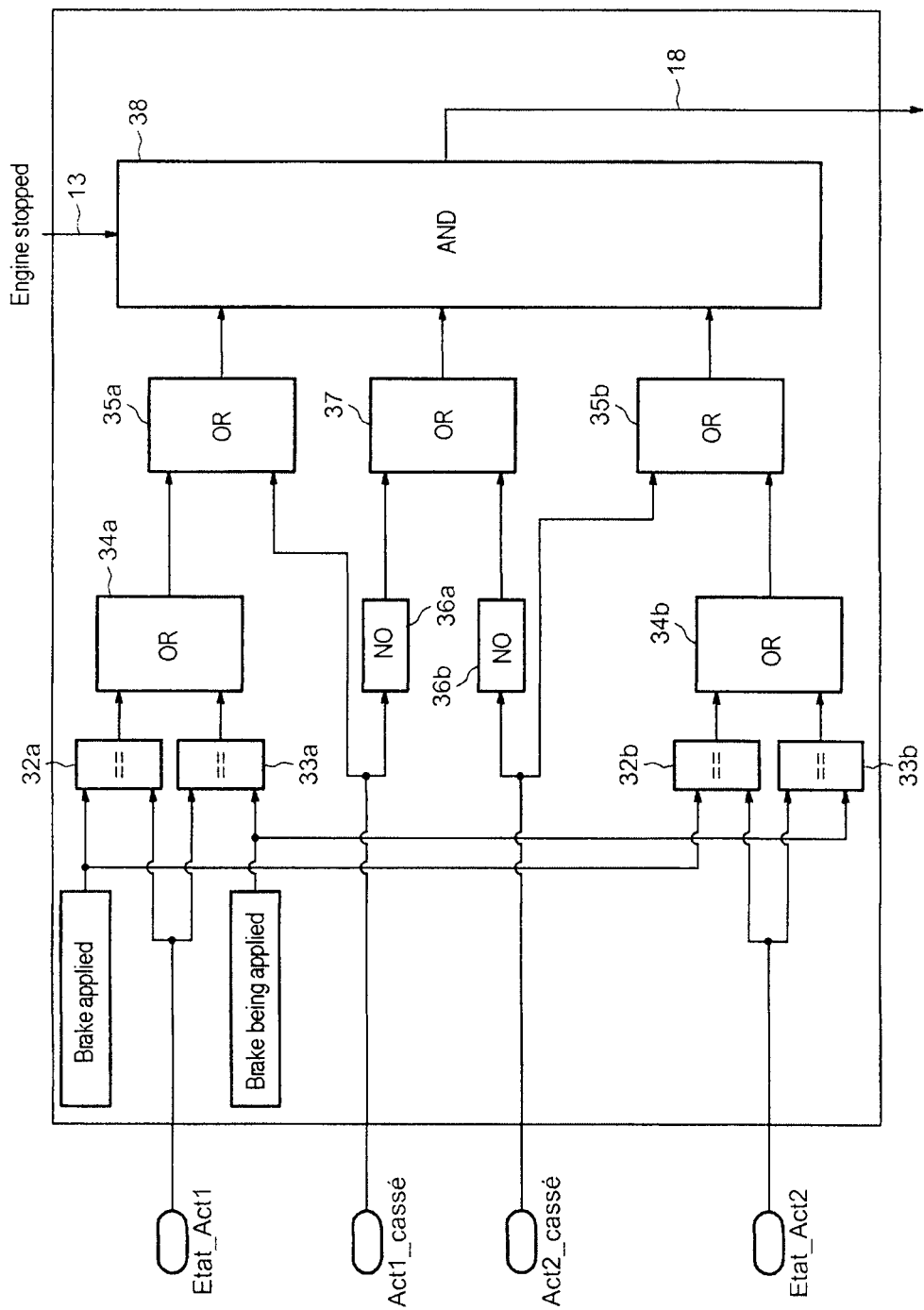
FIG. 3 illustrates schematically the structure of a module for determining the conditions for increasing application.

FIG. 3 illustrates a possible embodiment for the module 9 for determining the conditions for increasing the application.

The module for determining the conditions for increasing the application runs various logic tests based on information concerning the brake actuators No. 1 and 2, referenced 14 and 15 in FIG. 1. These items of information are symbolized by parameters which are as follows:
Etat_Act1 is the state of actuator No. 1, referenced 14 in FIG. 1. This state corresponds to the application made previously or to a "being applied" situation,
the parameter Act1_cassé corresponds to a malfunction of actuator No. 1,
the parameter Etat_Act2 corresponds to the state of actuator No. 2, referenced 15 in FIG. 1, and the parameter Act2_cassé corresponds to a malfunction of actuator No. 2.

The first logic test is run in the equals units 32a, 33a and 32b, 33b. The indices "a" correspond to actuator No. 1 while the indices "b" correspond to actuator No. 2. During these tests, the state of each of the actuators is verified by comparing the information originating from the actuator corresponding to a value brake applied or brake being applied.

A logic signal corresponding to one or other of these situations is conveyed to the input of two OR units 34a, 34b which transmit a logic signal which is then conveyed to the input of two other OR units 35a, 35b. A check is also made as to whether each of the actuators is operating based on the parameter Act1_cassé and the parameter Act2_cassé. A malfunction situation gives rise to a logic signal that is conveyed to the second input of the respective OR units 35a and 35b. When the two actuators No. 1 and No. 2 are both operating correctly, corresponding logic signals are conveyed at the output of the respective NO units 36a, 36b to the input of the OR unit 37. The outputs of the OR units 35a, 35b and 37 are conveyed to the input of the AND unit 38 which also receives at an input the engine stopped signal originating from the module for detecting whether the engine has been stopped, referenced 7 in FIG. 1, and which runs the logic tests illustrated in FIG. 2. At the output 18 of the AND unit 38 appears the signal for commanding the increase in application that is transmitted to the module 10 illustrated in FIG. 1 in order to control the increase in application of at least one of the two brake actuators 14 and 15.

An instruction to increase the application in a situation in which the engine has been stopped is therefore transmitted according to the following conditions:
detection that the engine has actually been stopped,
AND
the parking brake actuators are in the applied state or are being applied,
OR one of the actuators is faulty while the other actuator is in the applied state or is being applied, On the other hand, there is no request to increase the application when the two actuators are in a state of malfunction. The increase in the application is then disabled for safety reasons. Nor is there any request for an increase in the application if the brakes are in the released state, which corresponds to a specific desire of the driver.

Although, in the example illustrated, two parking brake actuators No. 1 and No. 2 have been used, it will be understood that the invention applies without major modification in the case of a power-assisted parking brake system that has only one actuator.

It would also be possible to command an increase in application if insufficient application is detected, the equals logic units 32a, 33a and 32b, 33b then being able to compare the state of each of the actuators to a value corresponding to insufficient application.

The invention claimed is:
1. A system for managing braking of a motor vehicle including a power-assisted parking brake with at least one brake actuator configured to act on at least one wheel of the vehicle and means for applying the parking brake, the system comprising:
- a first module for detecting whether an engine of the vehicle has been stopped, wherein conditions each result in the first module detecting that the engine has been stopped, and the conditions are:
  - the first module receives information via a CAN network from an engine management computer indicating that the engine has been stopped,
  - the first module determines that the information received from the engine management computer is not valid and receives information via the CAN network from an electric power supply of the engine that the electric power supply is switched off, and
  - the first module determines that the information received from the engine management computer and the information received from the electric power supply are not valid on the CAN network and receives information via a direct wire connection indicating that the electric power supply is switched off; and
- means for automatically increasing application of the parking brake after the first module detects that the engine of the vehicle has been stopped.

2. The system as claimed in claim 1, wherein the means for automatically increasing the application controls the increase in application.

3. The system as claimed in claim 2, wherein the first module for detecting whether the engine has been stopped transmits a signal characteristic of the engine having been stopped as a function of a state of the engine and of a state of the electronic power supply.

4. The system as claimed in claim 3, wherein the means for automatically increasing the application transmits a signal requesting an increase in the application of the parking brake as a function of a state of the at least one brake actuator and of signal characteristic of the engine being stopped.

5. A method for managing braking of a motor vehicle including a power-assisted parking brake with at least one brake actuator capable of acting on at least one wheel of the vehicle, comprising:
- applying the parking brake, via the at least one brake actuator, automatically or on request by the vehicle driver;
- detecting whether an engine of the vehicle has been stopped, wherein conditions each result in the detecting that the engine has been stopped, and the conditions are
  - a first module of the vehicle receives information via a CAN network from an engine management computer indicating that the engine has been stopped,
  - the first module determines that the information received from the engine management computer is not valid and receives information via the CAN network from an electric power supply of the engine that the electric power supply is switched off, and
  - the first module determines that the information received from the engine management computer and the information received from the electric power supply are not valid on the CAN network and receives information via a direct wire connection indicating that the electric power supply is switched off; and
- increasing the application of the parking brake, via the at least one brake actuator, automatically after the detecting confirms that the engine of the vehicle has been stopped.

6. The method as claimed in claim 5, further comprising:
transmitting a signal requesting an increase in the application of the parking brake as a function of a state of the at least one brake actuator and of a signal characteristic of the engine being stopped.

7. The method as claimed in claim 6, further comprising:
determining, before the signal requesting an increase in the application is transmitted, whether the at least one brake actuator is already applied or being applied and a state of operation of the at least one brake actuator.

* * * * *